United States Patent
Amblard et al.

(10) Patent No.: US 11,266,963 B2
(45) Date of Patent: Mar. 8, 2022

(54) VESSEL COMPRISING A BOTTOM OF DECREASING CROSS SECTION AND VARIABLE ANGLE OF INCLINATION, WITH LATERAL INJECTIONS OF LIQUID TO LIMIT FOULING

(71) Applicant: IFP Energies Nouvelles, Rueil-Malmaison (FR)

(72) Inventors: Benjamin Amblard, Rueil-Malmaison (FR); Joao Marques, Rueil-Malmaison (FR); Jean-Francois Le Coz, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 58 days.

(21) Appl. No.: 16/782,197

(22) Filed: Feb. 5, 2020

(65) Prior Publication Data
US 2020/0246770 A1 Aug. 6, 2020

(30) Foreign Application Priority Data
Feb. 6, 2019 (FR) .................................... 1901170

(51) Int. Cl.
*B01J 4/00* (2006.01)
*B01J 10/00* (2006.01)
*C10G 47/30* (2006.01)

(52) U.S. Cl.
CPC ............. *B01J 4/001* (2013.01); *B01J 10/002* (2013.01); *C10G 47/30* (2013.01)

(58) Field of Classification Search
CPC ... B01J 4/001; B01J 8/002; B01J 8/004; B01J 8/12; B01J 10/002; B01J 2204/002;
(Continued)

(56) References Cited

U.S. PATENT DOCUMENTS

| 3,846,079 A | 11/1974 | Alagy et al. |
| 3,907,665 A * | 9/1975 | Winter, III ................ C07C 4/18 208/146 |

(Continued)

FOREIGN PATENT DOCUMENTS

WO 18122717 A1 7/2018

OTHER PUBLICATIONS

Search report in corresponding FR1901170 dated Oct. 2, 2019 (pp. 1-8).

*Primary Examiner* — Brian A McCaig
(74) *Attorney, Agent, or Firm* — Millen, White, Zelano and Branigan, P.C.; Harry B. Shubin

(57) ABSTRACT

A vessel for the downflow of a preferably hydrocarbon liquid, containing solid particles: a bottom comprising a cylindrical upper part (11), a lower part (12) with a decreasing cross section and a varying angle of inclination α with respect to the vertical axis (Z), and an outlet pipe (9); injections (5) and (6) of recirculated and/or of makeup liquid into the lower and upper parts respectively; injections (5) inclined with respect to the tangent to the wall of the lower part at the injection point by an angle β1 in the vertical plane (xz) and by an angle β2 in the horizontal plane (xy); injections (6) are inclined with respect to the wall of the upper part by an angle θ1 in the vertical plane (xz) and by an angle θ2 in the horizontal plane (xy).

23 Claims, 7 Drawing Sheets

(58) Field of Classification Search
CPC ........ B01J 2208/00902; B01J 2219/194; B01J 19/2405; B01J 19/26; C10G 47/26; C10G 47/30; C10G 75/00
See application file for complete search history.

(56) References Cited

U.S. PATENT DOCUMENTS

| | | |
|---|---|---|
| 4,146,359 A | 3/1979 | Lumpkin et al. |
| 6,010,620 A | 1/2000 | Myers et al. |
| 2006/0047160 A1 | 3/2006 | Wonders et al. |

* cited by examiner

VESSEL COMPRISING A BOTTOM OF DECREASING CROSS SECTION AND VARIABLE ANGLE OF INCLINATION, WITH LATERAL INJECTIONS OF LIQUID TO LIMIT FOULING

TECHNICAL FIELD

The present invention relates to the field of the reduction of deposits of sediments or of unstable or insoluble molecules in vessels that have a bottom of decreasing cross section and variable angle of inclination, typically convex bottoms, such as reactors, separation and distillation vessels, mixers, blenders, settling vessels, used in methods that produce liquids liable to foul the said vessels. The invention also applies to methods that produce or process liquids liable to foul the vessels and, in particular, and non-exhaustively, to methods such as such as visbreaking, ebullated-bed hydrocracking, catalytic cracking, delayed coking in the refinery of petroleum products and to methods for liquefying coal and treating biomass. For example, the present invention advantageously applies to the separation and distillation vessels used downstream of the refining units that process heavy or fouling products.

PRIOR ART

Reducing the deposits that foul the vessels of certain equipment is a major problem in units for treating or converting hydrocarbon feedstocks, particularly in the case of heavy feedstocks. This is because the fouling of the vessels entails shutting down the unit and dismantling it in order to carry out cleaning. In units that convert hydrocarbon feedstocks in an ebullated bed, in particular, the fouling of the walls and of the bottom of the vessels of separation equipment may be caused by particles of an asphalt-like nature which flocculate to form solid deposits, molecules which adsorb onto the wall, particles of coke, catalyst fines, metal sulfides based on nickel, iron and/or vanadium, or more generally any solid contained in the hydrocarbon feedstock being processed.

Patent application U.S. Pat. No. 4,534,851A describes a method for introducing a liquid hydrocarbon feedstock into a transfer pipe leading to a reaction zone, involving an injection of steam and of the hydrocarbon feedstock as upflow, with separate concentric streams, the stream of hydrocarbon feedstock being the internal stream and the stream of steam being the circumferential stream, and directing some of the steam towards the internal wall of the said transfer pipe, whereas the rest of the steam and of the hydrocarbon feedstock are removed from the zone in a direction parallel to the longitudinal axis.

However, that application does not describe the device that makes it possible to reduce stagnant zones by recirculating the hydrocarbon liquid, or by topping up with external makeup liquid both into the frustoconical part and/or into the cylindrical part of the vessel.

The Applicant Company has filed French patent application number 17/59.606. That application relates to a device for the downflow of a hydrocarbon liquid containing solid particles, involving lateral injections of liquids in order to limit the phenomena whereby solids are deposited in equipment with frustoconical bottoms.

OBJECTIVES AND SUMMARY OF THE INVENTION

According to a first aspect, the present invention relates to a vessel for the downflow of a liquid, preferably a hydrocarbon liquid, containing solid particles, comprising:

a bottom comprising a cylindrical upper part of diameter D1, a lower part of decreasing cross section and variable angle of inclination α with respect to the axis of revolution (Z) of the said cylindrical upper part, and an outlet pipe of diameter D2, at least one injection of recirculated and/or makeup liquid into the said lower part of decreasing cross section and variable angle of inclination;

at least one injection of recirculated and/or makeup liquid into the said cylindrical upper part;

the said injection(s) situated in the said lower part being inclined with respect to the tangent to the wall of the lower part at the point of injection by an angle $\beta 1$ in the vertical plane (xz) and by an angle $\beta 2$ in the horizontal plane (xy); the said injection(s) situated in the said cylindrical upper part being inclined with respect to the wall of the cylindrical upper part by an angle $\theta 1$ in the vertical plane (xz) and by an angle $\theta 2$ in the horizontal plane (xy), the angles $\beta 1$ and $\theta 1$ being comprised between 5° and 175°, the angles $\beta 2$ and $\theta 2$ being comprised between 0° and 180°.

According to one embodiment, the lower part of decreasing cross section and variable angle of inclination comprises a convex portion, preferably of elliptical cross section.

The lower part with decreasing cross section and variable angle of inclination may be a convex portion of height L1 with a ratio L1/D1 comprised between 0.01 and 20, preferably comprised between 0.02 and 10, and more preferentially comprised between 0.1 and 5.

Alternatively, the lower part with decreasing cross section and variable angle of inclination further comprises at least one frustoconical portion, preferably surmounting the convex portion.

In that case, the ratio D1/D3 may be comprised between 0.05 and 0.9, D3 being the smallest diameter of the said frustoconical portion surmounting the said convex portion, and the ratio L3/D3 may be comprised between 0.01 and 10, L3 being the height of the said convex portion.

Advantageously, the convex portion comprises a solid insert forming a frustoconical internal surface of angle of inclination $\alpha'$, preferably comprised between 5° and 85°, the insert at least partially incorporating the injections situated in the convex portion of the lower part.

According to another embodiment, the lower part with decreasing cross section and variable angle of inclination comprises a succession of frustoconical portions, each one of the said successive parts preferably having an angle of inclination α that increases in the direction of the outlet pipe.

Preferably, the centre of the outlet pipe is situated at a distance L4 away from the wall of the cylindrical upper part, L4 being comprised between D2/2 and D1/2, and preferably equal to D1/2.

Advantageously, the vessel according to the invention comprises a recirculation pipe for part of the liquid leaving the said outlet pipe, the said recirculation pipe supplying at least one of the said injections with recirculated liquid.

The vessel according to the invention may comprise a makeup pipe for supplying at least one of the injections with makeup liquid.

The injections may be distributed in horizontal layers in the lower part and in horizontal layers in the cylindrical upper part, respectively.

Advantageously, the ratio D1/D2 is comprised between 1.1 and 1000, preferably between 2 and 500 and more preferably between 3 and 100.

Advantageously, the diameter D1 is comprised between 0.1 m and 30 m, preferably between 0.5 m and 20 m and highly preferably between 1 m and 10 m.

Preferably, the angles β1 and θ1 are comprised between 10° and 150°, highly preferably between 15° and 120°, more preferably between 15° and 90° and even more preferably between 20° and 60°. Preferably, the angles β2 and θ2 are comprised between 0° and 90°, and are preferably equal to 0°.

Advantageously, the height H between two horizontal layers is comprised between 0.01 m and 10 m, preferably between 0.05 m and 5 m, and highly preferably between 0.1 m and 1 m.

Advantageously, the number of injections N per layer is comprised between 1 and 30, preferably comprised between 2 and 10, and more preferably comprised between 2 and 6.

The injections within one and the same layer may be spaced by an angle δ equal to 360/N.

Preferably, the vessel is that of a gas/liquid separation means configured to process hydrocarbon feedstocks.

According to a second aspect, the invention relates to a method for the conversion of hydrocarbon feedstocks employing the vessel according to the invention.

Preferably, the said method employs an ebullated-bed hydroconversion step for feedstocks containing hydrocarbon fractions of which at least 50 wt % have a boiling point above 300° C.

The velocity V of the liquid injected into the said injections may be comprised between 0.05 m·s$^{-1}$ and 40 m·s$^{-1}$, preferably between 0.1 m·s$^{-1}$ and 30 m·s$^{-1}$ and highly preferably between 0.5 m·s$^{-1}$ and 10 m·s$^{-1}$.

The level of recirculated and/or of makeup liquid injected with respect to the hydrocarbon liquid circulating through the vessel is advantageously comprised between 1% and 400%, preferably between 5% and 100%, highly preferably between 10% and 60%, and more preferably still, between 20 and 50%.

Other subject-matter and advantages of the invention will become apparent on reading the description which follows of specific exemplary embodiments of the invention, given by way of nonlimiting examples, the description being made with reference to the appended figures described hereinbelow.

In the figures, the same references denote elements that are identical or analogous.

DESCRIPTION OF THE EMBODIMENTS

In general, the invention applies to any vessel of equipment through which a liquid circulates with the possibility of solid particles stagnating and accumulating in the bottom of the vessel. More specifically, the invention applies to any vessel through which there circulates a hydrocarbon liquid containing solid particles liable to stagnate and accumulate in the bottom of the vessel. More particularly, the injections are situated in the lower part of the vessel, which may for example be the vessel of an atmospheric or vacuum distillation column, of a separating tank, of a reactor, of a blender, of a settling vessel, etc., used in a method that produces or processes liquids liable to foul the vessels. Preferably, the vessel according to the invention is a vessel of an atmospheric or vacuum distillation column, of a separation tank or of any other gas/liquid separation means capable of handling hydrocarbon feedstocks.

According to the invention, the vessel is particularly well-suited to downflow of a liquid containing solid particles, preferably a hydrocarbon liquid, and in particular hydrocarbons, which comprises solid particles liable to stagnate and to accumulate at the bottom of the vessel. Solid particles also include any precipitant which might form in the liquid.

In the remainder of the text, what is meant by "injection" is any means known to those skilled in the art that allows liquid to be injected from the wall of the vessel towards the inside, the said means being fed via at least one liquid conveying pipe. These means may for example be tubular injections with a single orifice, or multi-orifice tubular injections.

Figure 1:
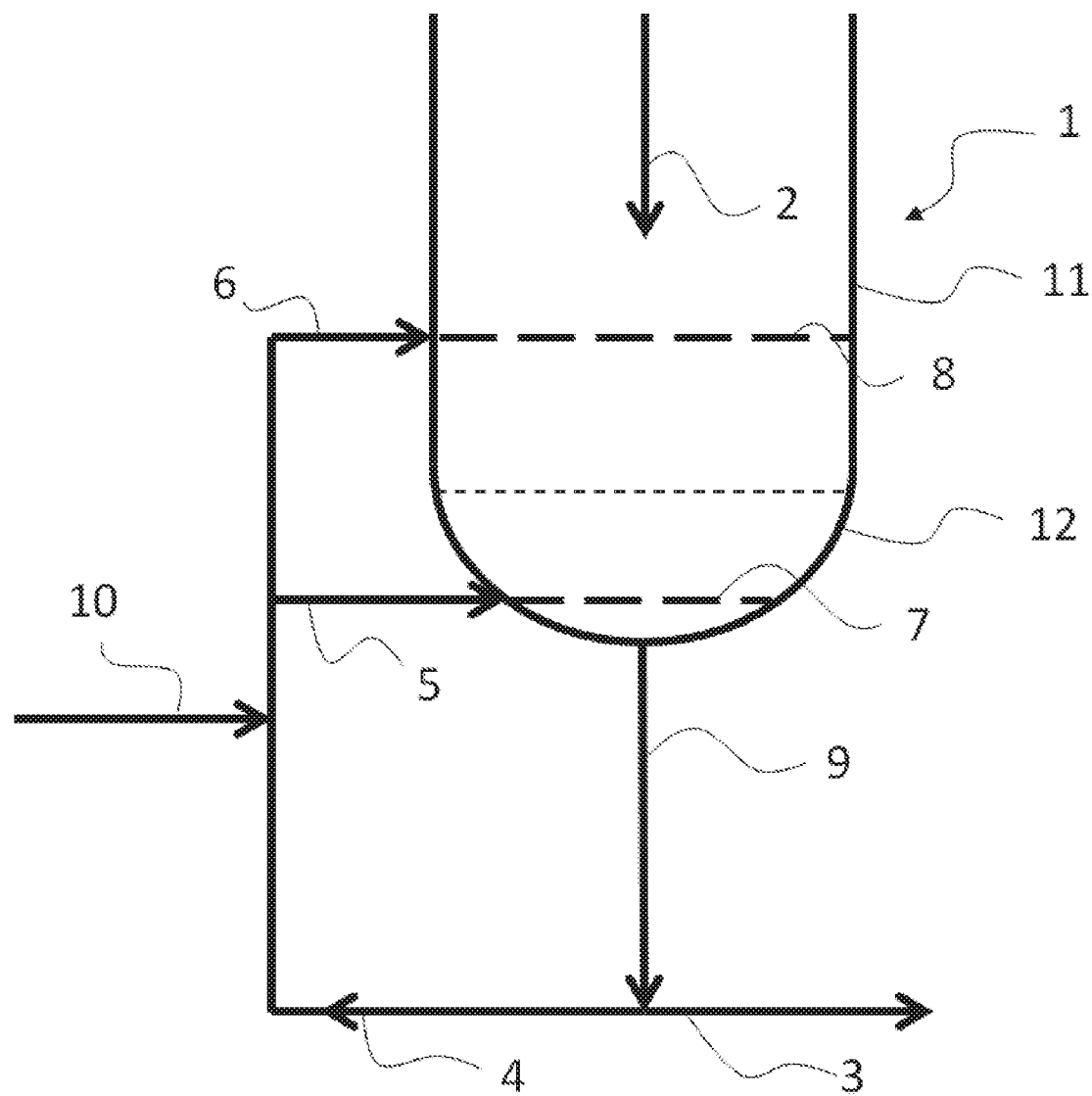
FIG. 1 is the schematic diagram for injections into the vessel 1 according to the invention.

FIG. 1 is the schematic diagram of the invention. The example of the flow of a hydrocarbon liquid has been chosen for the following description of the invention. However, the present invention is not restricted to a vessel for the downflow of a hydrocarbon liquid, but may apply to a vessel for the downflow of any type of fouling liquid, namely liquid containing solid particles or compounds liable to precipitate, for example to flocculate or to adsorb to the wall.

The vessel 1 according to the invention comprises a bottom comprising a cylindrical upper part 11 and a lower part 12 with decreasing cross section and variable angle of inclination α, typically a convex bottom, in which a fouling hydrocarbon liquid 2 flows downwards from the top of the vessel and leaves via an outlet pipe 9.

The bottom of the vessel 1 thus comprises the cylindrical upper part 11, the lower part 12 with decreasing cross section and variable angle of inclination α, and the outlet pipe 9.

What is meant by a decreasing cross section of the said lower part 12 is a transverse cross section, namely a cross section orthogonal to the axis Z (axis of revolution) of the cylindrical upper part 11 (which axis coincides with the vertical z) which decreases in the (downward) direction of flow of the hydrocarbon liquid containing solid particles, namely in the direction of the outlet pipe 9. What is meant by a cylinder is a cylinder of revolution.

What is meant by a variable angle of inclination α is that the angle α is not constant over the entire height of the lower part 12, and this notably excludes a conical or frustoconical lower part (made up of a single cone). The angle of inclination α, illustrated in FIG. 2 and described later on, is the angle formed between the tangent at a point on the wall in the lower part 112 and an axis parallel to the axis Z passing through this point.

This lower part 12 may be a convex part, known by those skilled in the art as "convex bottom" as described for example in the standard documents NF E 81-100, NF E 81-101 (convex bottoms with small knuckle radius "PRC"—radius of curvature greater than or equal to the outside diameter of the bottom and a knuckle radius comprised between 30 et 500 mm depending on the diameter), NF E 81-102 (convex bottoms with large knuckle radius "GRC"—radius of curvature equal to the outside diameter of the bottom and a knuckle radius equal to one tenth of this same diameter), NF E 81-103 (elliptical convex bottoms), NF E 81-104 (convex bottoms with a median knuckle radius "MRC"—knuckle radius equal to the outside diameter of the bottom and a knuckle radius comprised between one thirtieth and one fiftieth of this same diameter), or may be a part comprising a convex portion and at least one frustoconical portion, or else be a part comprising a succession of frustoconical portions, as described in greater detail hereinbelow in connection with FIGS. 2 to 5. Such shapes are well known to those skilled in the art for facilitating the drainage of the solids under gravity towards the outlet pipe. Furthermore, such shapes allow the hydrocarbon liquid a longer residence time compared with the conical bottoms, for the same ratio in diameters between the outlet pipe and the cylindrical upper part. Finally, such bottoms, particularly the convex bottoms, are well suited to pressure equipment, since the thickness of metal required is not as great as is required for conical bottoms.

Preferably, the upper part 11 and lower part 12 are continuous with one another, in other words successive, and the outlet pipe 9 comprises an opening positioned in the bottom of the lower part.

In order to reduce the formation of deposits on the wall and in the bottom of the vessel, the vessel comprises lateral injections of recirculated and/or of makeup liquid: injections 5 into the lower part 12 with decreasing cross section and variable angle of inclination, and injections 6 into the cylindrical part 11. These injections may be distributed at the wall in horizontal layers in the lower part 12 and in horizontal layers in the cylindrical part 11. The stream of exiting liquid is removed from the vessel via a discharge pipe 3.

In one embodiment of the invention, a pipe 10 for makeup liquid (which may be a flux) feeds the lateral injections 5 and 6 situated in the lower part 12 with decreasing cross section and variable angle, and in the cylindrical part 11, in order to reduce the stagnation zones in the vessel 1 and limit the deposits of solid particles on the walls. In the case of a vessel for a flow of hydrocarbon liquid, any fraction with a boiling point higher than or equal to the boiling point of the hydrocarbon liquid fed to the vessel 1, for example an effluent of catalytic cracking, such as a heavy fraction HCO ("Heavy Cycle Oil") or a light fraction LCO ("Light Cycle Oil") obtained by catalytic cracking, or any other vacuum gas-oil fraction VGO ("Vacuum Gas Oil"), atmospheric residue AR, vacuum residue VR, De-Asphalted oil DAO, or aromatic extract may be suitable as makeup liquid. More generally, the makeup liquid is preferably miscible with the liquid 2. Preferably, the makeup liquid does not cause any precipitation of minority chemical species dissolved in the liquid 2, or any flocculation, and neither does it encourage polymerization chemical reactions that could lead to solid particles, nor does it have a bubble point below the operating temperature of the vessel. According to this embodiment, the flowrate of liquid exiting via the discharge pipe 3 is equal to the sum of the flowrate of hydrocarbon liquid circulating through the vessel 2 and of the flowrate of makeup liquid injected in the makeup pipe 10. The makeup liquid injected through the makeup pipe 10 makes it possible to reduce the stagnation zones by generating turbulence in the vessel 1 so as to limit the depositing of solid particles on the walls. The said injected makeup liquid may also act as a flux when the liquid chosen is an aromatic base.

According to another embodiment of the invention, a proportion of the hydrocarbon liquid exiting the vessel 1 may be recirculated to feed the lateral injections 5 and 6. According to this embodiment, the flowrate of liquid exiting via the discharge pipe 3 is equal to the flowrate of the liquid 2. The liquid recirculated through the recirculation pipe 4 makes it possible to reduce the stagnation zones in the vessel 1 by generating turbulence or mixing so as to limit the depositing of solid particles on the walls.

According to yet another embodiment of the invention, the liquid injected in the lateral injections 5 and 6 may come both from the recirculation pipe 4 and from the liquid makeup pipe 10. According to this embodiment, the flowrate of liquid exiting via the discharge pipe 3 is equal to the sum of the flowrate of hydrocarbon liquid circulating through the vessel, referred to as fouling liquid 2, and of the flowrate of makeup liquid injected in the makeup pipe 10. The liquid injected through the makeup pipe 10 and through the recirculation pipe 4 makes it possible to reduce the stagnation zones by generating turbulence in the vessel 1 so as to limit the depositing of solid particles on the walls, and may also act as a flux as mentioned hereinabove.

The liquid injected by the lateral injections 5 and 6 may therefore be liquid recirculated from the vessel 1 and/or makeup liquid, namely a liquid coming from outside of the vessel 1.

The level of injection of the liquid injected by the lateral injections 5 and 6 is defined as being the ratio between the sum of the flowrate of liquid in the recirculation pipe 4 and of the flowrate of liquid in the makeup pipe 10 to the flowrate of hydrocarbon liquid circulating through the vessel, or fouling liquid 2.

The feedstock entering the vessel may contain any type of compound derived from an effluent from a hydroconversion method, for example coming from an ebullated-bed H-OIL™ unit, but may also contain any type of compound derived from an entrained-bed, known as slurry hydroconversion method, from a fixed-bed, moving-bed, or fluidized-bed hydrotreatment method, effluent from Fluid Catalytic Cracking (FCC), effluents from thermal conversion methods such as coking, visbreaking, and any other separation methods such as, for example, solvent deasphalting.

The solid particles may be precipitated asphaltenes, supported or unsupported catalyst fines (usually with a diameter of less than 500 microns) or particles of coke, or sulfides of metals such as nickel, vanadium, iron, or molybdenum.

The flow through the vessel is downflow. The injections of liquid may be performed in the bottom of a vessel of a vacuum distillation column or of an atmospheric column, or in the bottom of any gas—liquid separator.

Figure 2:
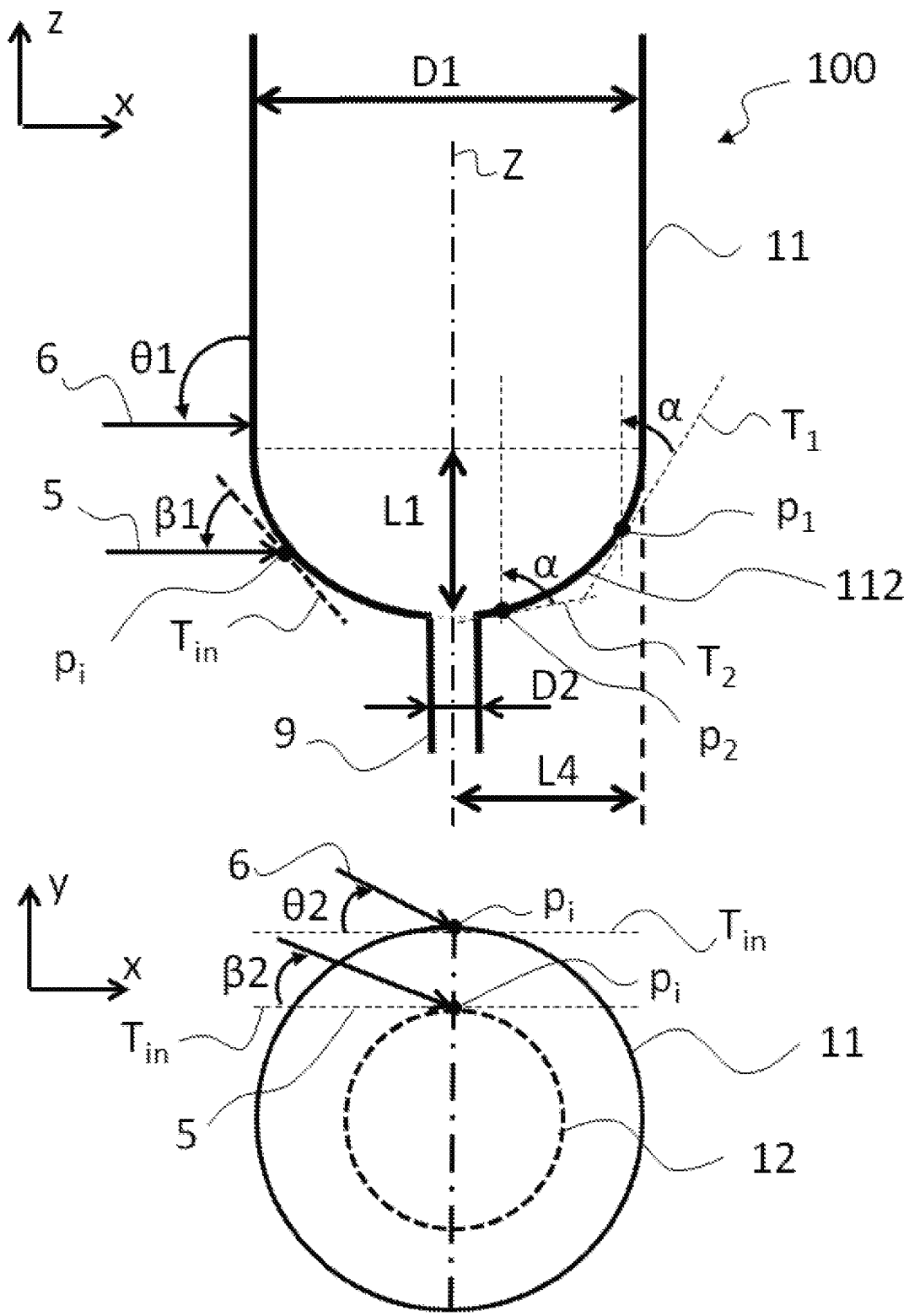
FIG. 2 illustrates one example of the implementation of the injections of recirculated and/or makeup hydrocarbon liquid into the cylindrical and convex parts of the bottom of the vessel 100 according to a first embodiment of the vessel.
Figure 3:
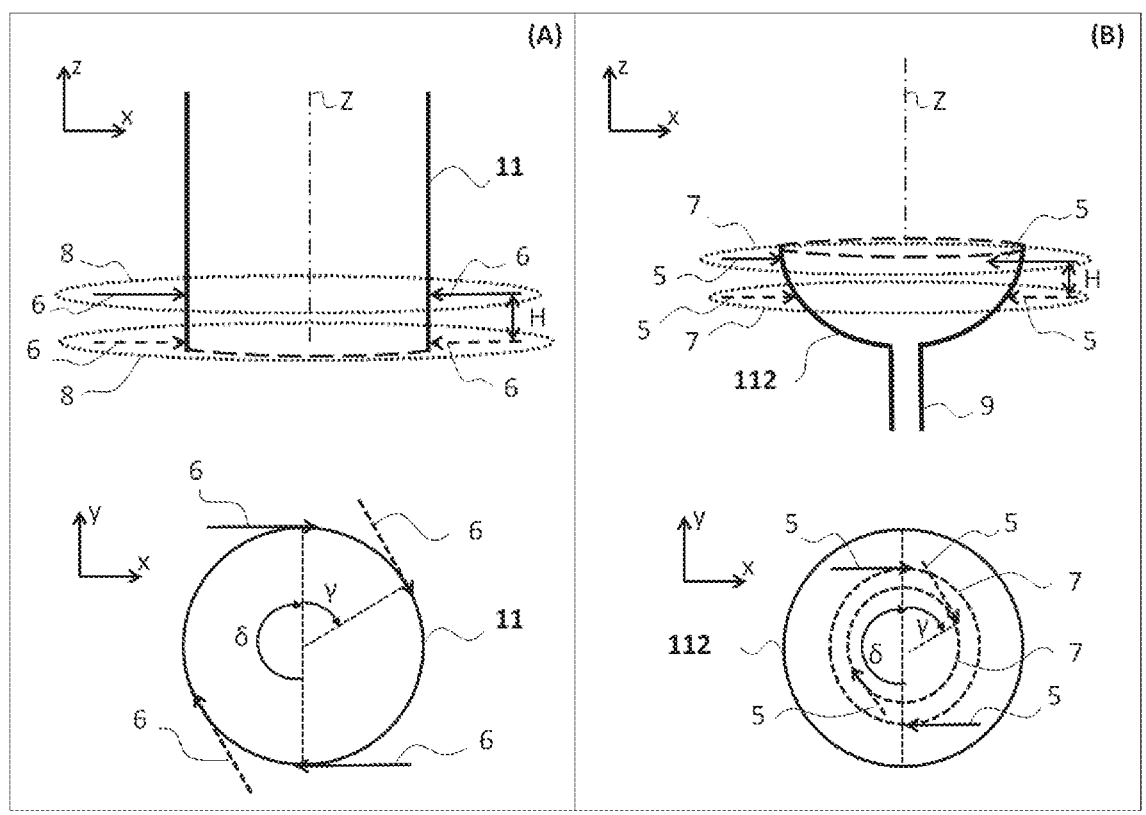
FIG. 3 illustrates the vessel according to the embodiment depicted in FIG. 2 and one example of the implementation of multiple lateral injections of liquid into the cylindrical and convex parts of the bottom of the vessel, in a side view, and in a view from above. (3A): multiple injections 6 into the cylindrical part of the bottom of the vessel 1; (3B): multiple injections 5 into the convex part of the bottom of the vessel 100.
Figure 4:
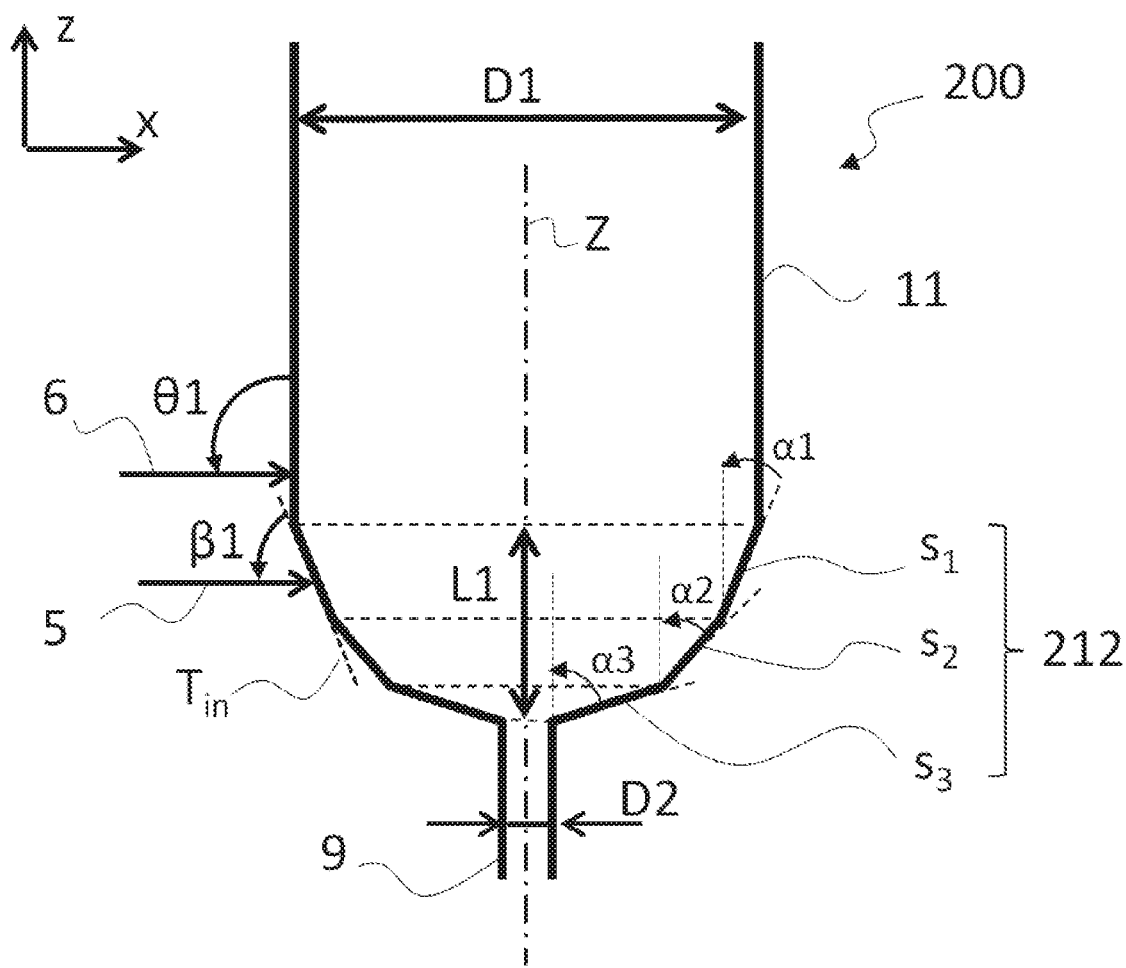
FIG. 4 illustrates one example of the implementation of the injections of recirculated and/or makeup hydrocarbon liquid into the cylindrical upper part and lower part having a plurality of frustoconical portions of the bottom of the vessel 200 according to a second embodiment.
Figure 5:
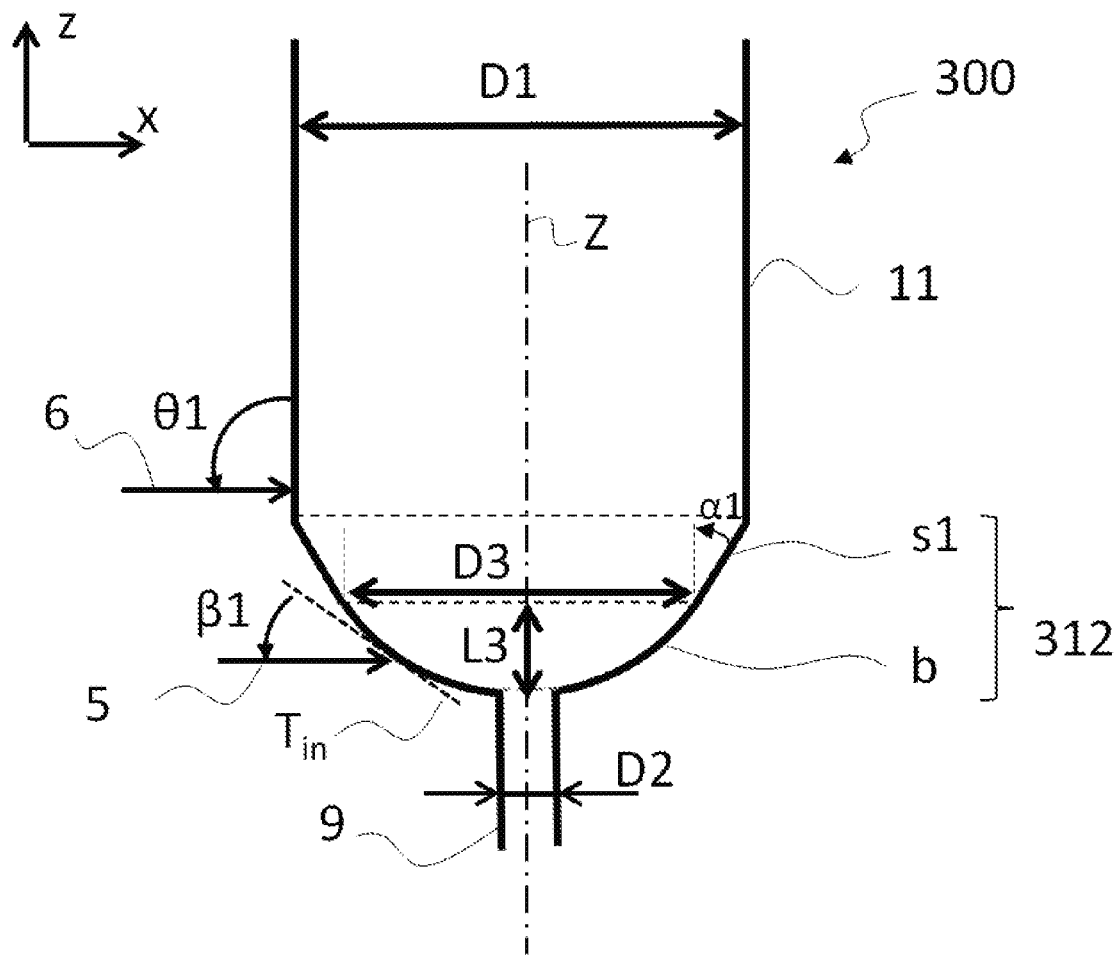
FIG. 5 illustrates one example of the implementation of the injections of recirculated and/or makeup hydrocarbon liquid into the cylindrical upper part and lower part having frustoconical and convex portions of the bottom of the vessel 300 according to a third embodiment.

FIGS. 2 to 5 illustrate examples of lateral injections in various embodiments of the vessel according to the invention. The lower part 12 with decreasing cross section and variable angle of inclination may comprise a convex portion, preferably of elliptical shape cross section, as illustrated in FIGS. 2,3 and 5. This convex part may extend over the entire height of the lower part 12, as shown in particular in FIGS. 2, 3 and 6, or simply constitute a portion of the said lower part, as for example illustrated in FIG. 5. The lower part 12 may alternatively comprise, and preferably be, a succession of frustoconical portions, preferably with an angle of inclination $\alpha$ that increases in the direction of the outlet pipe 9, as illustrated in FIG. 4.

FIG. 2 depicts the various types of lateral injections of the recirculated portion of the liquid or of the makeup liquid, in a vessel according to a first embodiment of the invention, in which the lower part of the bottom of the vessel 100 is a convex bottom 112.

The vessel 100, which may for example be that of a distillation column or of a separator, has a bottom comprising a cylindrical upper part 11 of diameter D1, a convex lower part 112, and an outlet pipe 9 situated in the bottom of the vessel, and by which the hydrocarbon liquid leaves, of diameter D2. The convex part 112 (also referred to as convex bottom), has a cross section that decreases and an angle of inclination $\alpha$ that varies with respect to the axis of revolution Z, which coincides with the vertical (z) in the operating position of the vessel 100, of the cylindrical part 11. The angle of inclination $\alpha$ is the angle formed between the tangent at a point on the wall in the lower part 112 and an axis parallel to the axis of revolution Z passing through this point (the vertical). The angle $\alpha$ varies, preferably between 0° and 180°. The angle $\alpha$ increases preferably in the direction of (down)flow of the liquid, namely in the direction of the outlet pipe 9. Thus, in FIG. 2, the value of the angle $\alpha$ at the point $p_1$, formed between the tangent $T_1$ and the vertical, is different from the value of the angle $\alpha$ at the point $p_2$, formed between the tangent $T_2$ and the vertical, and in this instance is smaller. The convex bottom may be characterized by the ratio L1/D1, L1 being the height of the convex bottom and D1 being the diameter of the cylindrical upper part 11, which corresponds to the diameter known as the "bottom outside diameter" for convex bottoms. The convex bottom may be of a type described according to the referenced standards already mentioned hereinabove and notably characterized by a radius of curvature Ri and a knuckle radius Rc. Preferably, the convex bottom of the vessel 100 is an elliptical convex bottom (for example as defined in normative document NF E 81-103). This may be a hemispherical bottom (the special case of an elliptical convex bottom, with L1=D1/2).

The ratio L1/D1 may be comprised between 0.01 and 20, preferably comprised between 0.02 and 10 and more preferentially comprised between 0.1 and 5. For example, the ratio L1/D1 is equal to 4.

There are two types of liquid injection (makeup or recirculated) defined:

- the injections 5 into the lower part 112 with decreasing cross section and variable angle $\alpha$, i.e. the convex part according to this embodiment, at the bottom of the vessel 100.
- the injections 6 into the cylindrical upper part 11 at the bottom of the vessel 100.

The injections 5 situated in the lower part 112 are inclined with respect to the tangent to the wall of the lower part 112 at the injection point $p_i$, by an angle $\beta1$ in the vertical plane (xz) and by an angle $\beta2$ in the horizontal plane (xy), x denoting the horizontal axis and z denoting the vertical axis coincident with the axis of revolution Z of the cylindrical upper part 11 and perpendicular to the horizontal plane (xy). As illustrated in FIG. 2, the angle $\beta1$ is defined in the anticlockwise direction (from the tangent to the wall at the injection point), and the angle $\beta2$ is defined in the clockwise direction (from the tangent to the wall at the injection point)

The injections 6 situated in the cylindrical upper part 11 are inclined with respect to the wall of the cylindrical body, coincident with the tangent to the wall of the upper part 11 at the injection point, by an angle $\theta1$ in the vertical plane (xz) and by an angle $\theta2$ in the horizontal plane (xy). As illustrated in FIG. 2, the angle $\theta1$ is defined in the anticlockwise direction (from the tangent to the wall at the injection point), and the angle $\theta2$ is defined in the clockwise direction (from the tangent to the wall at the injection point).

The injections are advantageously oriented in the same direction of rotation in the horizontal plane (xy) and advantageously situated in the liquid part of the bottom of the column.

The angles $\beta1$ and $\theta1$, defined in the plane (xz) with respect to the tangent $T_{in}$ to the wall, of the lower part 112 and of the upper part 11, respectively, at the injection point $p_i$, are comprised between 5° and 175°, preferably comprised between 10° and 150°, more preferentially comprised between 15° and 120°, more preferably comprised between 15° and 90°, and more preferably still, between 20° and 60°.

The angles $\beta2$ and $\theta2$, defined in the plane (xy) with respect to the tangent $T_{in}$ to the wall, of the lower part 112 and of the upper part 11, respectively, at the injection point $p_i$, are comprised between 0° and 180°, and preferably between 0° and 90°. Highly preferably, the angles $\beta2$ and $\theta2$ are equal to 0°, which means to say that the injection is tangential to the wall.

FIG. 3A shows the implementation of multiple injections 6 in the cylindrical part 11 of the bottom of the vessel 100. FIG. 3B shows the implementation of multiple injections 5 in the lower part 112 of decreasing cross section and variable angle of inclination $\alpha$, i.e. the convex lower part according to this embodiment, of the bottom of the vessel 100.

The injections are installed at the wall of the vessel in horizontal layers 8 in the plane (xy) in the case of the injections 6 into the cylindrical part 11, and in horizontal layers 7 in the case of the injections 5 into the lower part 112. Each layer of injections 7 and 8 into the lower part 112 and into the cylindrical part 11, respectively, comprises a respective number N of injections 5 or 6 located at the same height along the axis Z. In FIG. 3, N is equal to 2. Each layer is separated by a height H. Within a layer, each injection is separated from the next by an angle $\delta$ equal to 360/N in the plane (xy). As shown in FIG. 3, one layer of injections may be offset from another layer of injections by an angle $\gamma$ in the plane (xy).

The number of layers in each of the lower part 112 or cylindrical upper part 11 is advantageously comprised between 1 and 20, preferably between 1 and 10, and preferentially between 1 and 6.

The number N of injections at the wall of the vessel, in each horizontal layer 8 in the cylindrical upper part 11 and in each horizontal layer 7 in the lower part 112 is comprised between 1 and 30, preferably between 2 and 20, highly preferably between 2 and 10, and more preferably between 2 and 6. Each layer, whether this be within one and the same part or in the two parts, may have a different number N of injections.

The height H between two layers is advantageously comprised between 0.01 m and 10 m, preferably between 0.05 m and 5 m, and highly preferably between 0.1 m and 1 m.

The angle δ separating the injections in the circumference of one and the same layer is comprised between 0° and 180°, preferably comprised between 5° and 120°, highly preferably comprised between 10° and 90°. Advantageously, the angle δ is equal to 360/N where N denotes the number of injections per layer.

The angle γ denotes the angular offset of one layer with respect to the other. This angle may be comprised between 0° and 180°, preferably comprised between 5° and 120° and highly preferably comprised between 10° and 90°.

The velocity V of the liquid injected into the lateral injection pipes 5 and 6 is advantageously comprised between 0.05 m·s$^{-1}$ and 40 m·s$^{-1}$, preferably between 0.1 m·s$^{-1}$ and 30 m·s$^{-1}$ and highly preferably between 0.5 m·s$^{-1}$ and 10 m·s$^{-1}$. Preferably, the diameters of the injection pipes are dimensioned according to the flowrate of liquid to be injected so as to obtain the desired injection velocities.

The flowrate of liquid recirculated by the recirculation pipe 4 plus the flowrate of liquid injected by the pipe 10, to the flowrate of hydrocarbon liquid 2 circulating in the vessel 100 is advantageously comprised between 1% and 400%, preferably between 5% and 100%, highly preferably between 10% and 60%, and more preferably still, between 20% and 50%.

The diameter D1 of the cylindrical upper part 11 of the bottom of the vessel 100 is advantageously comprised between 0.1 m and 30 m, preferably between 0.5 m and 20 m, and highly preferably between 1 m and 10 m.

The ratio (D1/D2) between the diameter D1 of the cylindrical upper part 11 and the diameter D2 of the outlet pipe 9 in the bottom of the lower part 12 with decreasing cross section and variable angle of inclination α, is advantageously comprised between 1.1 and 1000, preferably comprised between 2 and 500, and preferentially, comprised between 3 and 100.

The outlet pipe 9 in the bottom of the lower part may be centred with respect to the axis Z, or may be offset, and is preferably centred. The centre of the outlet pipe 9 is situated at a distance L4 away from the wall of the cylindrical upper part 11, this distance L4 being comprised between D2/2 and D1/2, and preferably equal to D1/2 (the case of a centred outlet pipe 9 where the centre of the pipe is positioned on the axis Z).

FIG. 4 illustrates one example of lateral injections of recirculated liquid and/or of makeup liquid, in a vessel according to a second embodiment of the invention, in which the lower part 212 of the bottom of the vessel 200 is a bottom comprising a succession of frustoconical portions (s1, s2, s3). This embodiment is identical in every respect to the first embodiment described with reference to FIGS. 2 and 3, except for the said lower part of the bottom of the vessel 200. According to this second embodiment, the lower part 212 comprises, and is preferably made up of, a succession of frustoconical portions $s_p$ with angle of inclination $α_p$ with respect to the vertical (z). The angle $α_p$ of two successive frustoconical portions is different. For each frustoconical portion, the vertex of the cone points downwards, namely points towards the outlet pipe 9 at the bottom of the lower part 212. The cross section of the lower part 212 thus does indeed decrease and have a variable angle of inclination.

Although the angle of inclination $α_p$ of a second frustoconical portion situated directly beneath a first frustoconical portion, in the direction of downflow of the liquid in the vessel, may be smaller than that of the first frustoconical portion, the angle of inclination $α_p$ preferably increases in the direction of the outlet pipe 9. For example, the lower part is a succession of three frustoconical portions with respective angles of inclination α1, α2 and α3 with respect to the vertical z (or the axis of revolution Z), as illustrated in FIG. 4. The nearer each frustoconical portion is to the bottom of the lower part, the larger the angle of this portion, which means to say that this angle increases in the direction of the downflow of the liquid in the vessel, or in other words in the direction of the outlet pipe 9.

The number of frustoconical portions Ns may be comprised between 2 and 30, preferably between 2 and 10, and preferentially between 2 and 5, and more preferably still, between 3 and 5.

When Ns is large enough, for example greater than 10, the lower part approximates to a convex-bottom configuration.

The angle of inclination $α_p$ of a frustoconical portion $s_p$, the index p ranging from 2 to Ns, is advantageously comprised between 5° and 70°, preferably between 15° and 60° and highly preferably comprised between 30° and 50°.

The injections of liquid 5 and 6 are performed as already described in respect of the first embodiment of the vessel according to the invention, in connection with FIGS. 2 and 3. In particular, for the injections 5 in the lower part 212, the injection point may be situated at any point on each frustoconical portion. With the exception of the points at which the frustoconical parts meet, the tangent $T_{in}$ at the injection point is coincident with the wall of the frustoconical portion. The angles of the injections 5 are always such that the injection is performed from the wall of the vessel towards the interior of the vessel. This is true whatever the embodiment of the invention.

According to this second embodiment, the injections 5 are preferably performed in at least two horizontal layers 7, each one positioned at the level of a different frustoconical portion.

FIG. 5 illustrates an example of lateral injections of recirculated liquid and/or of makeup liquid in a vessel according to a third embodiment of the invention, in which the lower part 312 of the bottom of the vessel 300 is a bottom comprising at least one frustoconical portion with the cone vertex pointing downwards and at least one convex portion, the said frustoconical portion preferably surmounting the said convex portion. Preferably, the lower part 312 is formed by a single convex portion b comprising the outlet pipe 9 and surmounted by a single frustoconical portion s1, as illustrated in FIG. 5. In this case, the frustoconical portion $s_1$ has an angle of inclination α1 with respect to the vertical z (or the axis of revolution Z), which may be comprised between 5° and 70°, preferably comprised between 15° and 60° and highly preferably comprised between 30° and 50°. Alternatively, the convex portion is surmounted by a succession of frustoconical portions similar to the succession described for the third embodiment of the invention in connection with FIG. 4, without there being any need to repeat the description here.

The convex portion b is of the same type as the one described for the first embodiment and again its description is not repeated here, except for the fact that the height L3 of the convex portion b does not constitute the entire height L1 of the lower part 312 but only part of that height, the other part being that made up of the height of the frustoconical portion or portions. The convex portion b may thus be characterized by the ratio L3/D3, D3 being the smallest diameter of the frustoconical portion s1 directly surmounting the convex portion b, which corresponds to the bottom outside diameter according to the terminology adopted for convex bottoms. The ratio L3/D3 is advantageously comprised between 0.01 and 10, preferably comprised between 0.02 and 5 and more preferentially comprised between 0.02 and 3.

The ratio D1 to D3 is advantageously comprised between 0.05 and 0.9, preferably comprised between 0.1 and 0.7 and preferentially comprised between 0.2 and 0.6.

The injections of liquid are performed as already described in respect of the first and second embodiments of the vessel according to the invention, in connection with FIGS. 2 to 4. In particular, in the case of the injections 5 into the lower part 312, the injection point may be situated at any point on the frustoconical portion or portions and on the convex portion b. With the exception of the points at which the frustoconical parts, if there are a plurality of these, meet, the tangent $T_{in}$ at the injection point is coincident with the wall of the frustoconical portion.

According to a fourth embodiment of the invention, the lower part of the bottom of the vessel comprises, and preferably is, a convex portion fitted with a solid insert forming a frustoconical surface inside the vessel. The insert is preferably made from a material that can be shaped or that can be cast, for example in a mould. Preferably, this material is a refractory concrete, which is advantageously inert with respect to the chemical products present in the vessel. The frustoconical internal surface of the insert forms an angle of inclination α' with respect to the axis Z (or the vertical z), which is preferably comprised between 5° and 85°, preferably between 10° and 70°, and preferentially, between 20° and 45°. The insert at least partially incorporates the injections 5 situated in the convex portion of the lower part, which means to say that the injections are in part or in full contained within the insert, set into the material of which the insert is made.

The shape and the directions of the injections may have thus been constructed directly in the component made of solid material that is going to constitute the insert, making them mechanically easier to implement.

This insert may advantageously be installed at the time of manufacture of the vessel and, in particular, of the bottom of the vessel, or else may be fitted into the convex bottom of an already-existing vessel.

The invention applies to methods that produce liquids liable to foul the vessels such as, for example, and non-exhaustively, visbreaking, ebullated-bed hydrocracking, catalytic cracking, delayed coking in the refinery of petroleum products and to methods for liquefying coal and treating biomass. Specifically, the invention is not restricted to the fields of oil refining and the production of fuels, but may be applied more generally to the fields of pharmacy, chemistry, the agri-foodstuffs industry, the processing of ores, and any method involving the conversion of material.

The invention thus relates to a method for the conversion of hydrocarbon feedstocks using the vessel as described hereinabove.

The method preferably comprises an ebullated-bed hydroconversion step for feedstocks containing hydrocarbon fractions of which at least 50 wt % have a boiling point above 300° C.

For example, this step is carried out using the technology and under the conditions of the H-Oil™ process, as described, for example, in the patents U.S. Pat. Nos. 4,521,295 or 4,495,060 or 4,457,831, or in the Aiche paper, Mar. 19-23, 1995, Houston, Tex., paper number 46d, "Second generation ebullated bed technology".

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1901170, filed Feb. 6, 2019 are incorporated by reference herein.

EXAMPLES

Numerical mechanical CFD ("Computational Fluid Dynamics") simulations using the Fluent software were performed on a liquid flow in a vessel with a convex bottom having an L1/D1 ratio equal to 4 without injections (comparative) and, in the same vessel with a convex bottom with lateral injections of recirculated liquid according to the invention. This software package uses a Eulerian approach for the liquid phase.

Table 1 sets out the conditions simulated, and the characteristics and dimensions of the vessel according to the invention, including the number of injections, the number of layers and the injection angles, and of the vessel according to the prior art without injections.

TABLE 1

| Vessel dimensions | |
|---|---|
| Diameter D1 (m) | 1.2 |
| Diameter D2 (m) | 0.15 |
| Length L1 (m) | 0.5 |
| Number of layers in the cylindrical upper part | 1 |
| Number of layers in the hemispherical lower part | 1 |
| Number of injections per layer | 2 |
| Angle β1 (injections 5) | 45° |
| Angle β2 (injections 5) | 0° |
| Angle θ1 (injections 6) | 90° |
| Angle θ2 (injections 6) | 0° |
| Distance L4 (m) | 0.6 |
| Operating conditions | |
| Density of hydrocarbon liquid 2 (kg/m³) | 990 |
| Net flow rate of hydrocarbon liquid 2 (kg/s) | 9.8 |
| Level of injection (flowrate of the liquid recirculated in pipe 4 to flowrate of circulating hydrocarbon liquid 2) | 30% |

Figure 6:
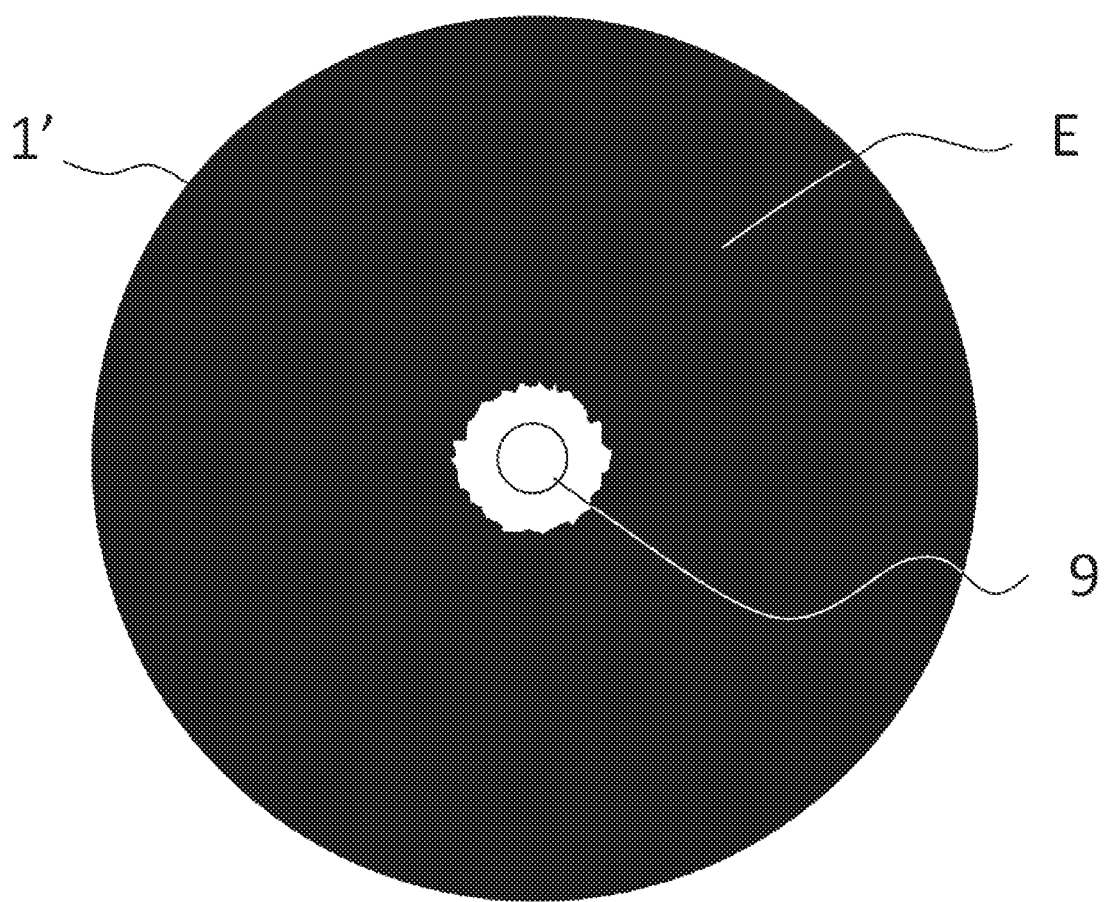
FIG. 6 is a view from above of the bottom of one example of a vessel 1' with a convex bottom according to the prior art without injections, illustrating the stagnant zones at which the velocities of the liquid close to the wall are below 10 cm/s, which are zones at which solid particles could potentially accumulate.

FIG. 6 (a view from above of the example of the vessel according to the prior art) illustrates, for the (comparative) configuration without injection, the zones E of the vessel 1' at which the velocities of the liquid close to the walls are below 10 cm/s (shown very dark in the figure). These zones represent the so-called "stagnation" zones where an accumulation of solid particles may occur. This figure shows, in a view from above, the location of the outlet pipe 9 at the bottom of the hemispherical part.

Figure 7:
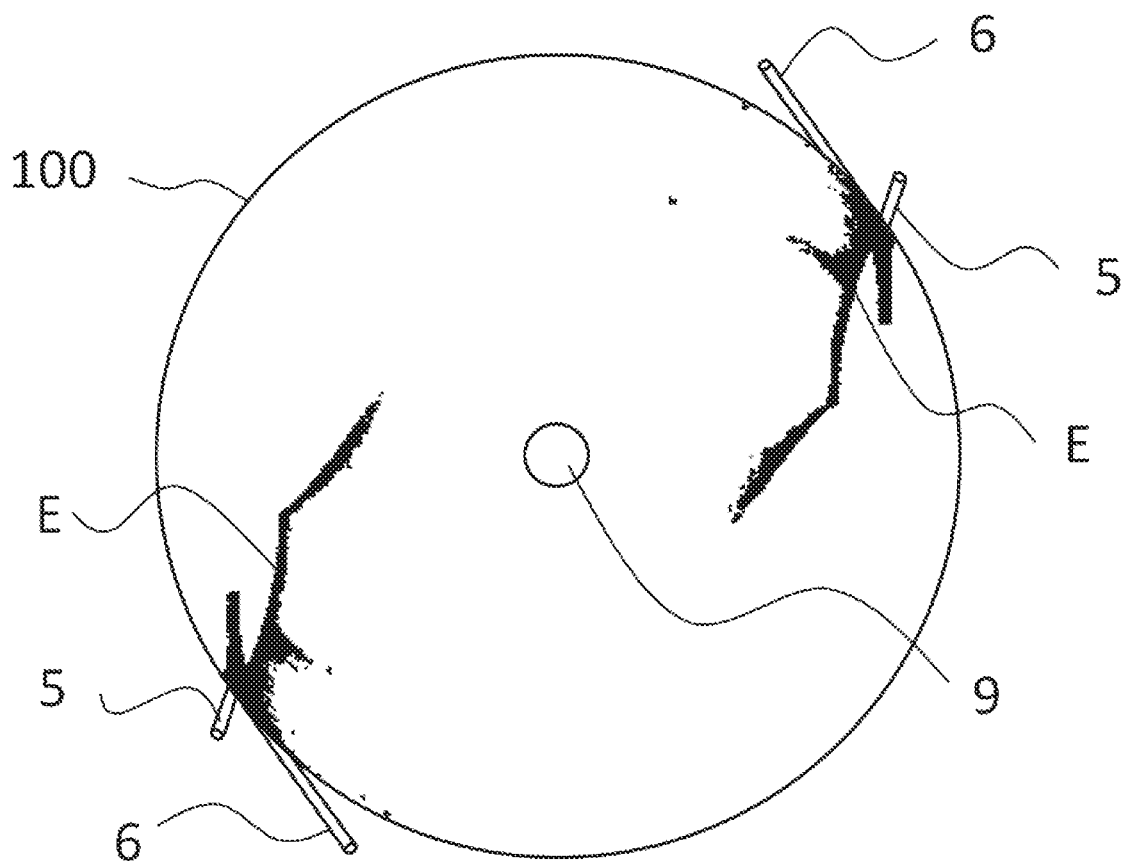
FIG. 7 is a view from above of one example of a vessel 100 according to the invention with a convex bottom, with injections in the bottom of the vessel, illustrating the stagnant zones at which the velocities of the liquid close to the wall are below 10 cm/s, which are zones at which solid particles could potentially accumulate.

FIG. 7 (a view from above of the example of the vessel according to the invention) illustrates, for the configuration with injections according to the invention, the zones E of the vessel 100 at which the velocities of the liquid close to the walls are below 10 cm/s. This figure shows, in a view from above, the location of the injections 5 and 6 and that of the outlet pipe 9 at the bottom of the hemispherical part.

By comparing FIGS. 6 and 7, it is possible to see the drastic reduction in potential zones at which solid could accumulate thanks to the installation of the lateral injections of liquid in the vessel according to the invention.

One stagnation-zone criterion "Crit" may be defined as being the ratio between the surface area at which the liquid close to the wall of the bottom of the column is below 10 cm/s and the surface area of the bottom of the column.

Table 2 below indicates the value of the stagnation-zone criterion Crit for the configuration without and with injections.

TABLE 2

| Stagnation-zone criterion "Crit" | |
|---|---|
| configuration without injections | 97% |
| configuration with injections | 12% |

Thus, by calculating the stagnation-zone criterion Crit, it becomes apparent that, in the configuration according to the invention, with 30% of the hydrocarbon liquid being recirculated to feed two injections 5 in the hemispherical lower part and two injections 6 in the cylindrical upper part with a geometry according to the invention, the stagnation zones are reduced by 85%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method comprising injecting recirculated and/or makeup liquid into a bottom of a vessel (1, 100, 200, 300) in which vessel there is downflow of a liquid containing solid particles, a bottom comprising a vertical cylindrical upper part (11) of diameter D1, a lower part (112, 212, 312) of decreasing cross section and variable angle of inclination α with respect to the vertical axis of revolution (Z) of the vertical cylindrical upper part, and an outlet pipe (9) of diameter D2, said method comprising injecting of at least one injection (5) of said recirculated and/or makeup liquid into the said lower part (112, 212, 312) of decreasing cross section and variable angle of inclination;

injecting of at least one injection (6) of said recirculated and/or makeup liquid into the vertical cylindrical upper part (11);

the said injection(s) (5) situated in the said lower part (112, 212, 312) being inclined with respect to the tangent ($T_{in}$) to the wall of the lower part at the injection point by an angle β1 in the vertical plane (xz) and by an angle β2 in the horizontal plane (xy); the said injection(s) (6) situated in the said vertical cylindrical upper part being inclined with respect to the wall of the vertical cylindrical upper part by an angle θ1 in the vertical plane (xz) and by an angle θ2 in the horizontal plane (xy), the angles β1 and θ1 being comprised between 5° and 175°, the angles β2 and θ2 being comprised between 0° and 180°.

2. The method according to claim 1, wherein in the vessel the lower part (112, 212, 312) with decreasing cross section and variable angle of inclination comprises a convex portion (112, 312).

3. The method according to claim 2, wherein in the vessel the lower part (112, 212, 312) with decreasing cross section and variable angle of inclination is a convex portion of height L1 with a ratio L1/D1 comprised between 0.01 and 20.

4. The method according to claim 2, wherein in the vessel the said lower part (112, 212, 312) with decreasing cross section and variable angle of inclination further comprises at least one frustoconical portion (s1).

5. The method according to claim 4, wherein in the vessel the ratio D1/D3 is comprised between 0.05 and 0.9, D3 being the smallest diameter of the said frustoconical portion (S1) surmounting the said convex portion (b), and wherein the ratio L3/D3 is comprised between 0.01 and 10, L3 being the height of the said convex portion (b).

6. The method according to claim 2, wherein in the vessel the convex portion comprises a solid insert forming a frustoconical internal surface of angle of inclination α', comprised between 5° and 85°, the said insert at least partially incorporating the injections (5) situated in the said convex portion of the said lower part.

7. The method according to claim 2, wherein the convex portion (112, 312) has an elliptical cross section.

8. The method according to claim 1, wherein in the vessel the said lower part (212) with decreasing cross section and variable angle of inclination comprises a succession of frustoconical portions (s1, s2, s3).

9. The method according to claim 1, wherein in the vessel, the center of the outlet pipe (9) is situated at a distance L4 away from the wall of the vertical cylindrical upper part (11), L4 being comprised between D2/2 and D1/2.

10. The method according to claim 1, comprising in the vessel a recirculation pipe (4) receiving part of the liquid leaving the said outlet pipe (9), the said recirculation pipe (4) supplying at least one of the said injections (5) or (6) with recirculated liquid.

11. The method according to claim 1, comprising in the vessel a makeup pipe (10) supplying at least one of the said injections (5) or (6) with makeup liquid.

12. The method according to claim 1, wherein in the vessel the injections are distributed in horizontal layers (7) in the lower part (112, 212, 312) and in horizontal layers (8) in the vertical cylindrical upper part (11), respectively.

13. The method according to claim 12, wherein in the vessel the height H between two horizontal layers is comprised between 0.01 m and 10 m.

14. The method according to claim 12, wherein the number of injections N per layer is comprised between 1 and 30.

15. The method according to claim 14, wherein the injections into one and the same layer are spaced by an angle δ equal to 360/N.

16. The method according to claim 1, wherein in the vessel the ratio D1/D2 is comprised between 1.1 and 1000.

17. The method according to claim 1, wherein in the vessel the diameter D1 is comprised between 0.1 m and 30 m.

18. The method according to claim 1, wherein in the vessel the angles β1 and θ1 are comprised between 10° and 150°.

19. The method according to claim 1, wherein in the vessel the angles β2 and θ2 are comprised between 0° and 90°.

20. The method according to claim 1, which is a gas/liquid separation processing hydrocarbon feedstocks.

21. The method according to claim 1, that is an ebullated-bed hydroconversion of feedstocks containing hydrocarbon fractions of which at least 50 wt % have a boiling point above 300° C.

22. The method according to claim 21, wherein the velocity V of the liquid injected in the said injections is comprised between 0.05 m·s$^{-1}$ and 40 m·s$^{-1}$.

23. The method according to claim 21, wherein the level of recirculated and/or of makeup liquid injected with respect to the hydrocarbon liquid circulating through the vessel is comprised between 1% and 400%.

\* \* \* \* \*